(12) United States Patent
Enfield

(10) Patent No.: US 10,851,963 B2
(45) Date of Patent: Dec. 1, 2020

(54) LIGHT FOR A TRAILER, AND RELATED SYSTEMS AND METHODS

(71) Applicant: MarineFit, LLC, North Bend, WA (US)

(72) Inventor: Mark Enfield, North Bend, WA (US)

( * ) Notice: Subject to any disclaimer, the term of this patent is extended or adjusted under 35 U.S.C. 154(b) by 0 days.

(21) Appl. No.: 16/027,330

(22) Filed: Jul. 4, 2018

(65) Prior Publication Data
US 2019/0011108 A1   Jan. 10, 2019

Related U.S. Application Data

(60) Provisional application No. 62/528,640, filed on Jul. 5, 2017.

(51) Int. Cl.
| | | |
|---|---|---|
| *B60Q 1/26* | (2006.01) |
| *F21V 31/00* | (2006.01) |
| *F21S 45/30* | (2018.01) |
| *F21S 43/14* | (2018.01) |
| *B60Q 1/30* | (2006.01) |
| *F21S 43/15* | (2018.01) |
| *F21S 43/27* | (2018.01) |
| *F21S 43/20* | (2018.01) |
| *F21S 43/19* | (2018.01) |
| *F21S 41/29* | (2018.01) |
| *F21S 41/20* | (2018.01) |

(Continued)

(52) U.S. Cl.
CPC ............ *F21S 45/30* (2018.01); *B60Q 1/2696* (2013.01); *B60Q 1/305* (2013.01); *F21S 41/285* (2018.01); *F21S 41/29* (2018.01); *F21S 43/14* (2018.01); *F21S 43/15* (2018.01); *F21S 43/19* (2018.01); *F21S 43/26* (2018.01); *F21S 43/27* (2018.01); *F21V 31/005* (2013.01); *F21W 2107/20* (2018.01); *F21Y 2115/10* (2016.08)

(58) Field of Classification Search
CPC ........ B60Q 1/305; B60Q 1/2607; B60Q 1/30; B60Q 1/26; B60Q 1/2696; B60Q 1/32; F21S 45/50
USPC .................................................. 362/459–549
See application file for complete search history.

(56) References Cited

U.S. PATENT DOCUMENTS 3,858,039 A * 12/1974 Moore .................... F21V 31/00
   362/285
5,136,484 A *  8/1992 Eaton ....................... B60Q 1/26
   362/267

(Continued)

*Primary Examiner* — William J Carter
(74) *Attorney, Agent, or Firm* — Janeway Patent Law, PLLC; John M. Janeway

(57) ABSTRACT

A lens for a trailer light includes a body that transmits light when exposed to light, and a pad operable to mount the lens in front of a light emitting device. The body has a first edge and a second edge located opposite the first edge. The pad is configured to position the body away from the light emitting device such that, when the lens is mounted in front of the light emitting device, a passage is formed between the light emitting device and the body. The passage that is formed has a first opening defined by the first edge of the body, and a second opening defined by the second edge of the body. The first and second openings are configured such that water enters the passage when the lens is mounted to the light emitting device and the lens and light emitting device are submerged in water, and the passage does not hold water when the lens and light emitting device emerge from being submerged in water.

25 Claims, 5 Drawing Sheets

(51) Int. Cl.
*F21Y 115/10* (2016.01)
*F21W 107/20* (2018.01)

(56) References Cited

U.S. PATENT DOCUMENTS 6,273,588 B1 * 8/2001 Arakelian ............ B60Q 1/2607
                                              362/267
7,018,079 B1 * 3/2006 Franco-Vila ............. A62B 1/20
                                              362/253

* cited by examiner

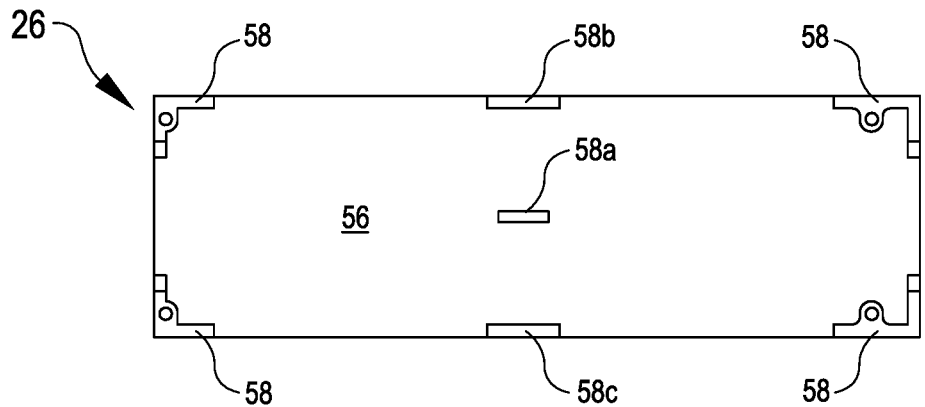
FIG. 4A
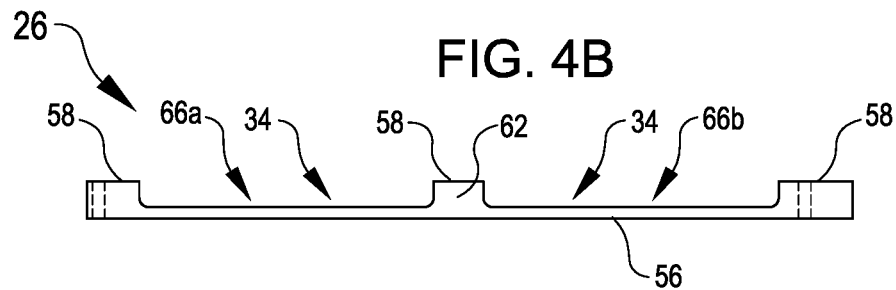
FIG. 4B
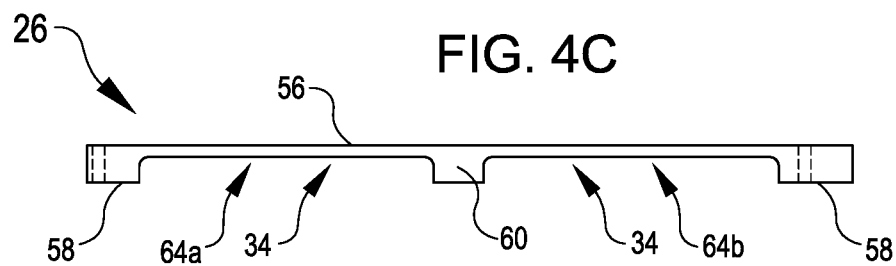
FIG. 4C
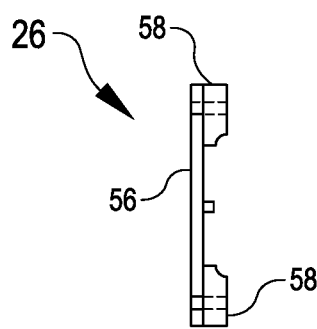 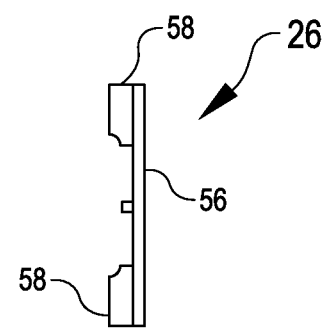
FIG. 4D  FIG. 4E

LIGHT FOR A TRAILER, AND RELATED SYSTEMS AND METHODS

BACKGROUND

Boat trailer lights typically include an incandescent bulb that generates light when a current of electricity flows through a filament in the bulb. Because the filament often breaks or otherwise gets damaged when an incandescent light bulb is subjected to vibrations or mechanical shocks, the trailer lights also include a housing that is easy to disassemble to allow one to change a damaged bulb located inside the housing's chamber. But by making the housing easy to disassemble, the housing cannot easily make the housing's chamber water-tight. In response to this problem, many housings include an opening at the bottom, but not at the top. In this configuration, when the housing is submerged in water, air inside the chamber does not escape and thus makes it difficult for water to enter the chamber. But, if some water does get into the chamber, then the water would drain out of the opening at the bottom when the housing emerged from the water. Unfortunately, water and moisture often enter the housing's chamber and corrodes electrical components and contact points of the light. This causes one to regularly maintain and often replace such electrical components. This problem is compounded if the trailer is used in a salt water.

With the introduction of light emitting diodes (LEDs), trailer light designs have changed. Because many LED lamps have an expected life as high as 100,000 hours and are highly resistant to vibrations or mechanical shocks, the requirement for an accessible light chamber has been eliminated. For a variety of reasons related to cost, performance and longevity, trailer light designs include a light housing that forms a water-tight chamber where the LEDs are located. Although this is an improvement over the open housing for an incandescent bulb, there are many drawbacks to a sealed housing that creates reliability and safety issues. Regardless of the sealing method, the sealed chamber often leaks, which can corrode electrical components of the trailer light and often causes the lens of the trailer light to fog up. The moisture inside the housing also promotes the growth of algae and/or mold inside the housing. All of these problems adversely affect the ability of the trailer light to shine light beyond the housing, which causes one to replace the whole trailer light.

Thus, there is a need for a trailer light that does not fog up or otherwise lose its ability to shine light beyond the light's housing and/or lens.

SUMMARY

In one aspect of the invention, a lens for a trailer light, includes a body that transmits light when exposed to light, and a pad operable to mount the lens in front of a light emitting device. The body has a first edge and a second edge located opposite the first edge. The pad is configured to position the body away from the light emitting device such that, when the lens is mounted in front of the light emitting device, a passage is formed between the light emitting device and the body. The passage that is formed has a first opening defined by the first edge of the body, and a second opening defined by the second edge of the body. The first and second openings are configured such that water enters the passage when the lens is mounted to the light emitting device and the lens and light emitting device are submerged in water, and the passage does not hold water when the lens and light emitting device emerge from being submerged in water.

With the passage capable of quickly and completely shedding all water when the lens and the light emitting device emerge from being submerged in water, the water that is located in the passage while the lens and light emitting device are submerged quickly and completely drains from the passage. This helps prevent the chamber in which the light emitting device is located from fogging up. This also helps reduce the ability of algae and mold to grow inside the passage, and if algae and/or mold do start to grow in the passage, then they can be easily removed with a hose and water without separating the lens and light emitting device. This in turn helps maintain the lens' ability to transmit much of the light generated by the light emitting device to the environment beyond the lens.

In another aspect of the invention, a housing for a trailer light includes a body and a pad operable to mount the housing behind a light emitting device. The body includes a first edge and a second edge located opposite the first edge. The pad is configured to position the body away from the light emitting device such that, when the housing is mounted behind the light emitting device, a passage is formed between the light emitting device and the body. The passage that is formed has a first opening defined by the first edge of the body, and a second opening defined by the second edge of the body. The first and second openings are configured such that water enters the passage when the housing is mounted to the light emitting device and the housing and light emitting device are submerged in water, and the passage does not hold water when the lens and light emitting device emerge from being submerged in water.

In yet another aspect of the invention, a trailer light includes a light emitting device, and a lens mounted in front of the light emitting device. The lens includes a body that transmits light when exposed to light, and a pad configured to position the lens away from the light emitting device such that a passage is formed between the light emitting device and the lens' body. The body has a first edge and a second edge located opposite the first edge. The passage that is formed has a first opening defined by the first edge of the body, and a second opening defined by the second edge of the body. The first and second openings are configured such that water enters the passage when the lens and light emitting device are submerged in water, and the passage does not hold water when the lens and light emitting device emerge from being submerged in water.

Figure 1:
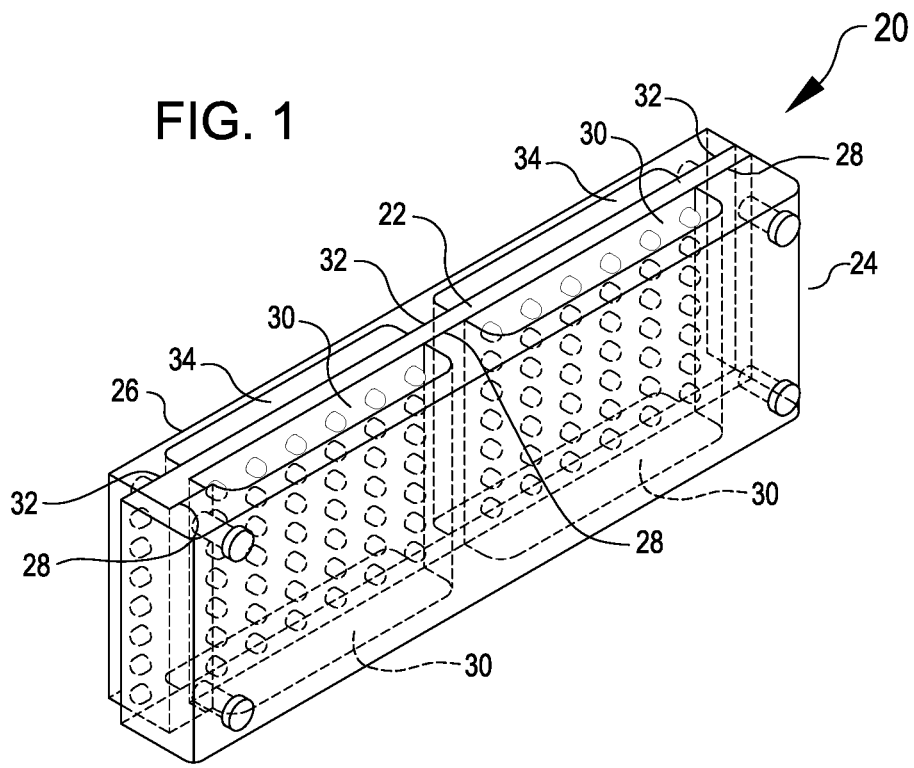
FIG. 1 shows a perspective view of a light, according to an embodiment of the invention.

Each of FIGS. 3A-3E shows a view of a lens of the light shown in FIG. 1, each according to an embodiment of the invention.

Figure 4F:
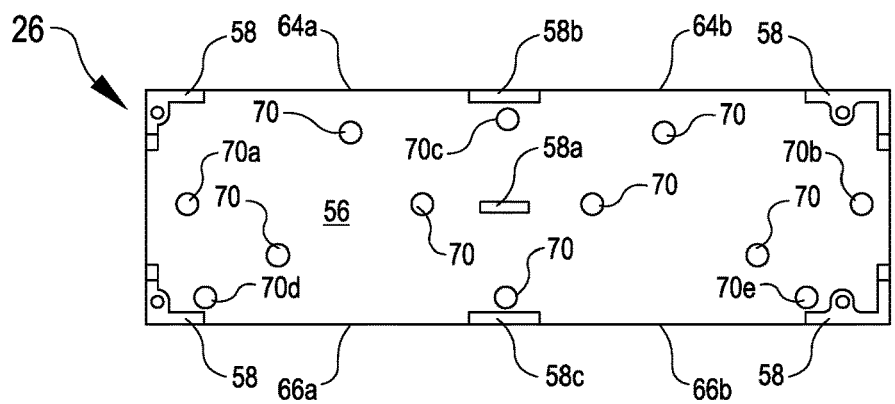
Figure 5A:
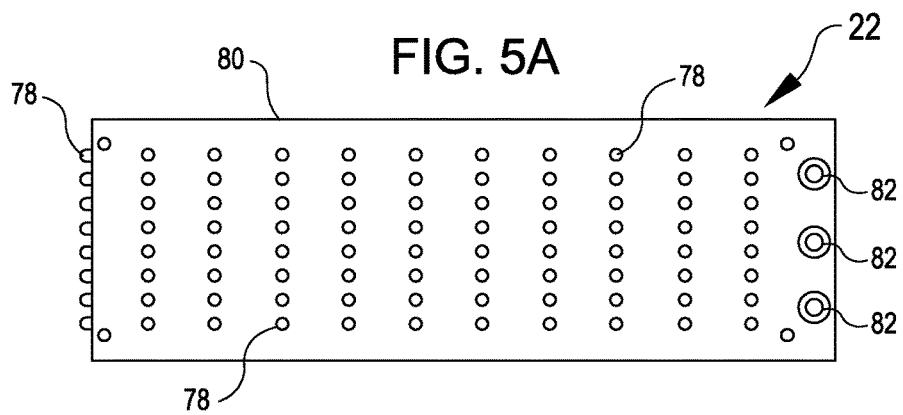
Figure 5B:
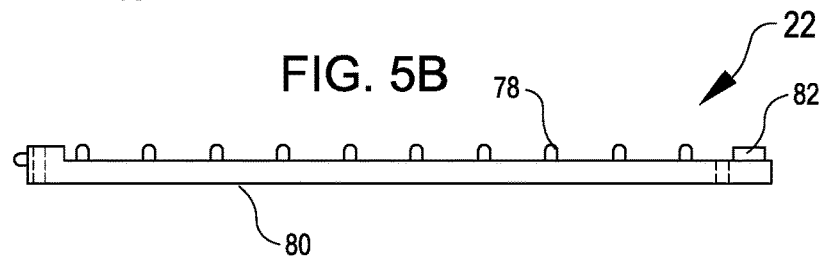
Figure 5C:
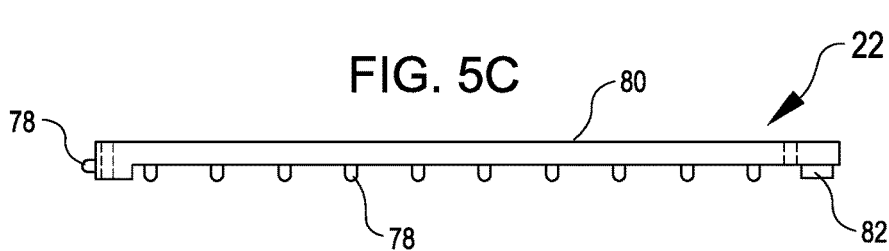
Figure 5D:
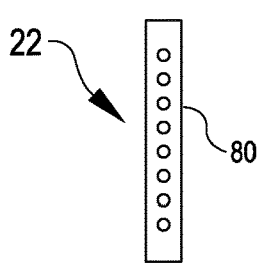
Figure 5E:
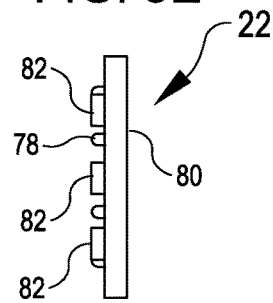

Each of FIGS. 4A-4F shows a view of a housing of the light shown in FIG. 1, each according to another embodiment of the invention. FIGS. 4A-4E show one embodiment of the housing, and FIG. 4F shows another embodiment of the housing.

Each of FIGS. 5A-5E shows a view of a light emitting device of the light shown in FIG. 1, each according to an embodiment of the invention.

Figure 6:
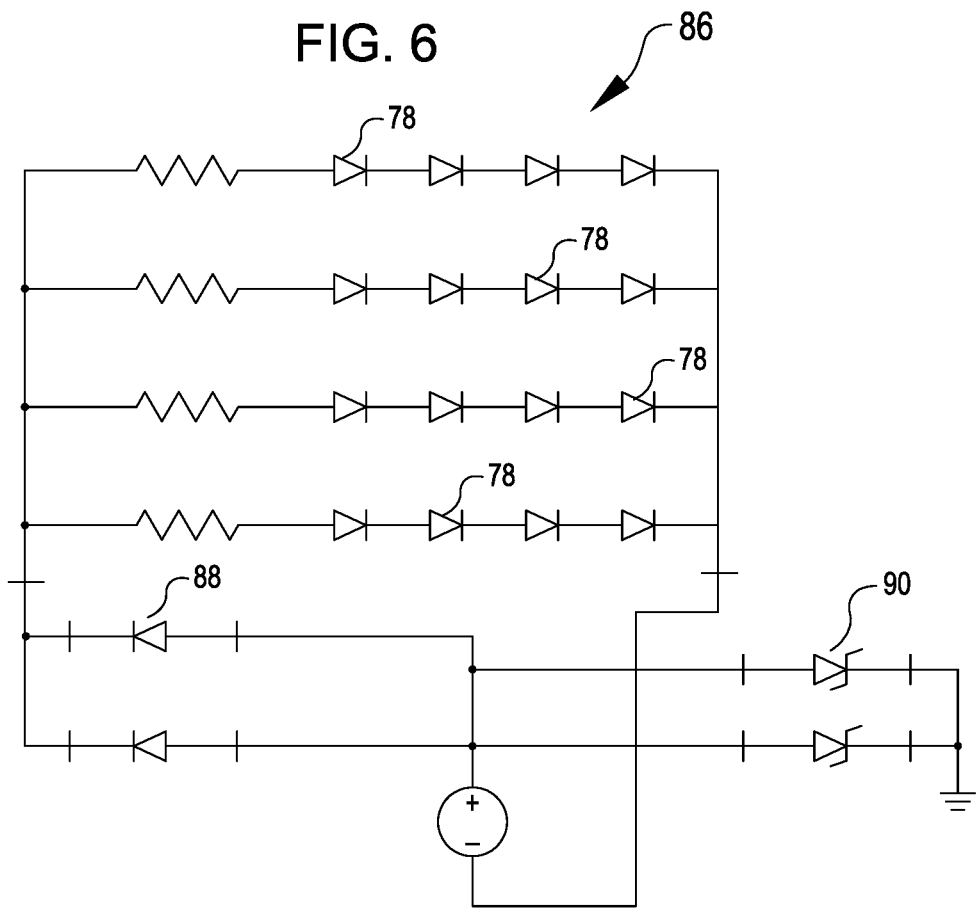

FIG. 6 shows a schematic view of a circuit of the light emitting device shown in FIGS. 5A-5E, according to an embodiment of the invention.

Figure 7:
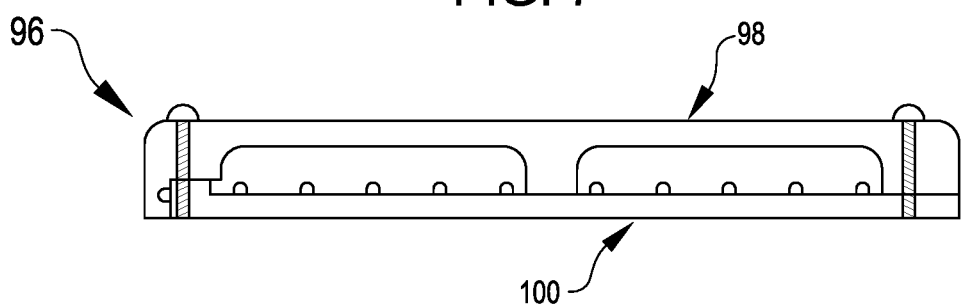

FIG. 7 shows a top view of a light, according to another embodiment of the invention.

DETAILED DESCRIPTION

Figure 2:
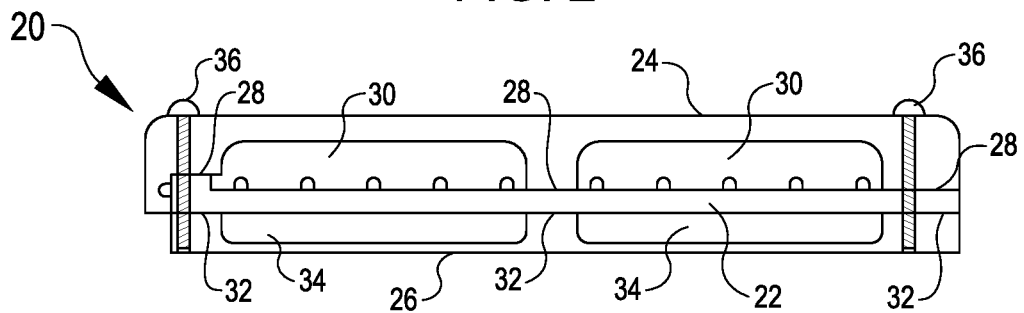
FIG. 2 shows a top view of the light shown in FIG. 1, according to an embodiment of the invention.
Figure 3A:
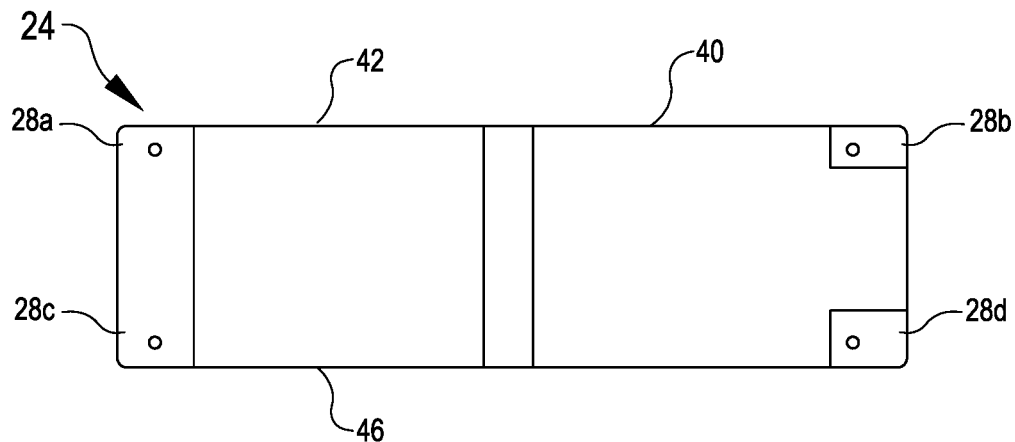
Figure 3B:
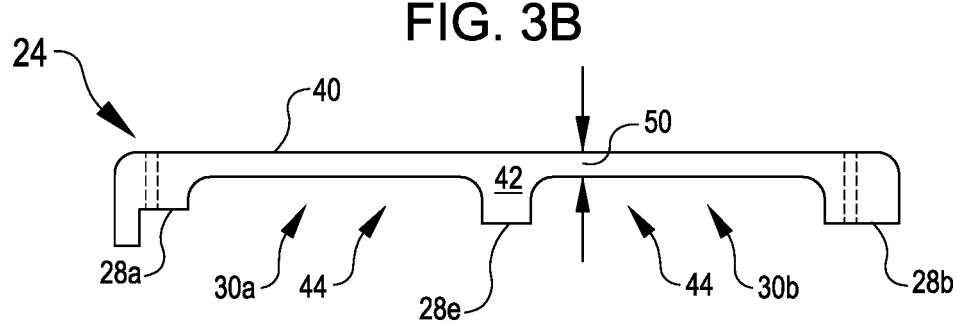
Figure 3C:
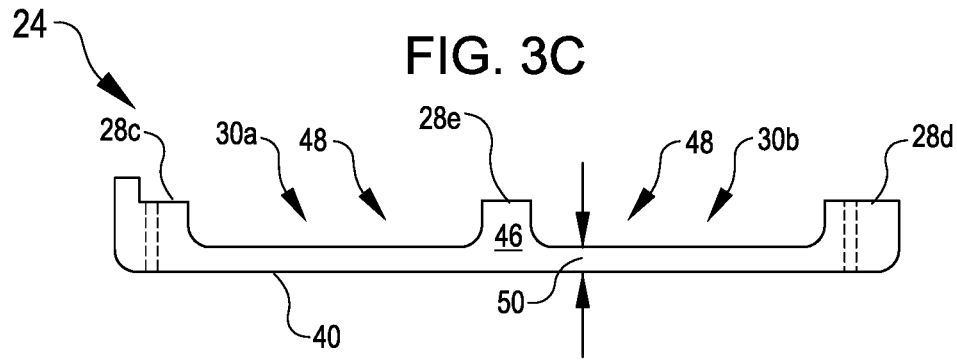
Figure 3D:
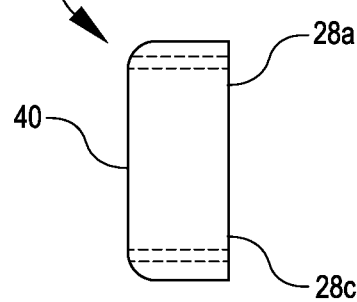
Figure 3E:
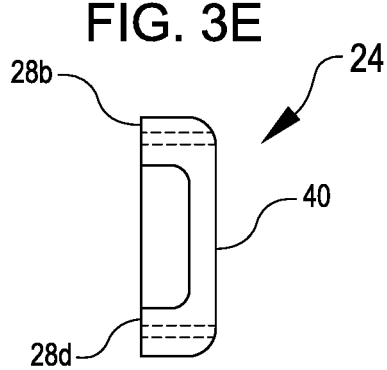

Each of FIGS. 1 and 2 shows a view of a light 20, according to an embodiment of the invention. FIG. 1 shows a perspective view of the light 20, and FIG. 2 shows a cross-sectional view. The light 20 includes a light emitting device 22 (discussed in greater detail in conjunction with FIGS. 5A-6), a lens 24 and a housing 26. Here, the light 20 is used as a light for a boat trailer to illuminate when the lights are on and indicate when the person towing the trailer applies his/her brakes or signals the direction that he/she will be turning. The light 20, however, may also be used as a light for other types of trailers as well as any other desired vehicle that should have a light to convey the intentions of the driver of the trailer or vehicle and that could be exposed to the outdoor environment.

The lens 24 transmits light when exposed to light and includes a pad 28 configured to position the lens 24 in front of the light emitting device 22 and a passage 30 that exposes the light emitting device 22 to the outside environment but does not hold or trap the outside environment that is located in the passage 30. Thus, when the boat trailer is submerged in water while launching a boat, the passage 30 allows the water to freely flow between the light emitting device 22 and the lens 24. And when the boat trailer emerges from the water, the passage 30 does not hold or retain any of the water between the light emitting device 22 and the lens 24 and allows all of this water to freely drain out of the passage 30. When the boat trailer carries the boat to and from the boat ramp, the passage 30 allows the air to freely flow between the light emitting device 22 and the lens 24.

With the passage 30 capable of quickly and completely shedding all water when the lens 24 and the light emitting device 22 emerge from being submerged in water, the water that is located in the passage 30 while the lens 24 and light emitting device 22 are submerged quickly and completely drains from the passage 30. This helps prevent the chamber in which the light emitting device 22 is located from fogging up. This also helps reduce the ability of algae and/or mold to grow inside the passage 30, and if algae and/or mold do start to grow in the passage 30, then they can be easily removed with a hose and water without separating the lens 24 and light emitting device 22. This in turn helps maintain the lens' ability to transmit much of the light generated by the light emitting device 22 to the environment beyond the lens 24. And, with the passage 30 allowing air to flow between the light emitting device 22 and the lens 24 when the light 20 is not submerged, the flowing air helps dry out the passage 30 and removes objects that may have been trapped while the light 20 was submerged in water. The passage 30 also allows one to easily clean dust or dirt that may have been collected while transporting the boat trailer out of water by simply running water through the passage 30 with a hose.

Similar to the lens 24, the housing 26 includes a pad 32 configured to position the housing 26 behind the light emitting device 22 and a passage 34 that exposes the light emitting device 22 to the outside environment but does not hold or trap the outside environment that is located in the passage 34. Thus, just like the lens 24, when the boat trailer is submerged in water, the passage 34 allows the water to freely flow between the light emitting device 22 and the housing 26. And when the boat trailer emerges from the water, the passage 34 does not hold or retain any of the water between the light emitting device 22 and the housing 26 and allows all of this water to freely drain out of the passage 34. In addition, when the boat trailer carries the boat to and from the boat ramp, the passage 34 allows the air to freely flow between the light emitting device 22 and the housing 26.

The light emitting device 22, the lens 24 and the housing 26 may be coupled to each other to form the light 20 using any desired fastening technique. For example, in this and other embodiments, four screws 36 (only two shown in FIG. 2) each located at a respective one of the four corners of the light emitting device 22, the lens 24 and the housing 26 releasably couple the components 22, 24 and 26 together. In other embodiments, two or more of the components 22, 24 and 26 may be more permanently fixed to the other(s) with an adhesive and/or a rivet.

Each of FIGS. 3A-3E shows a view of a lens 24 of the light 20 shown in FIG. 1, each according to an embodiment of the invention. In addition to the lens 24 including a pad 28 and a passage 30, the lens 24 includes a body 40 that transmits light when exposed to light and that has a first edge 42 that defines a first opening 44 of the passage 30, and a second edge 46 that defines a second opening 48 of the passage 30. In this and other embodiments, the first opening 44 lies vertically above the second opening 48 when the lens 24 is coupled to a light emitting device 22 and both are mounted to a trailer.

The body 40 may be configured as desired. For example, in this and other embodiments when the body 40 is exposed to light the body 40 transmits the light without changing the direction of a portion of the transmitted light relative to the direction of another portion of the transmitted light. That is, the body 40 does not diffuse or concentrate the light from the light emitting device 22 that it transmits. More specifically the body has a thickness 50 that is constant throughout the body 40 and is made of a plastic that transmits much of the light that it is exposed to.

Other embodiments of the body 40 are possible. For example, the body 40 may be configured to concentrate the light that it transmits from the light emitting device 22, or the body may be configured to diffuse the light. For another example, the body 40 may be made of a plastic or other material that filters out one or more wavelengths of the light generated by the light emitting device 22. For yet another example, the body may be made of glass.

The pad 28 may be configured as desired to position the body any desired distance in front of the light emitting device 22. In this manner, the pad 28 also helps determine the depth, and thus the configuration, of the passage 30. In this embodiment and other embodiments, the pad 28 includes five pads 28a, 28b, 28c, 28d and 28e. Each of the pads 28a-28d is located at a respective one of the corners of the body 40, and the pad 28e is located in the middle of the body 40 and extends from the body's first edge 42 to the body's second edge 46. More specifically, each of the pads 28a-28e has a thickness that is more than twice the thickness 50 of the body 40, and the same for each of the pads 28a-28e. In this configuration, the pads 28a-28e position the body 40 in front of the light emitting device 22 such that the distance between the light emitting device 22 and the lens' body 40 is the same or constant throughout the body 40 when the distance is measured perpendicular to the light emitting device 22.

Other embodiments are possible. For example, one or more of the pads 28a-28e may have a thickness that is different than one or more of the other pads 28a-28e. For another example, the lens 24 may include more than five pads 28a-28e or fewer than five pads 28a-28e.

Still referring to FIGS. 3A-3E, the passage 30 may be configured as desired. For example, in this and other embodiments, because the body 40 has a constant thickness 50 and each of the pads 28a-28e has the same thickness, the passage 30 is rectangular in shape. And because the pad 28e extends from the body's first edge 42 to the body's second edge 46 and is located in the middle of the body 40, the passage 30 includes a first portion 30a and a second portion 30b. More specifically, each of the passage portions 30a and 30b includes a rectangular first opening 44, a rectangular second opening 48, and a cross-sectional shape that does not change as each of the passage portions 30a and 30b extends from the first opening 44 to the second opening 48. In addition, each of the passage portions 30a and 30b has a cross-sectional area that remains constant as each of the passage portions 30a and 30b extends from the first opening 44 to the second opening 48, and each of the portions 30a and 30b lies adjacent the other portion such that the first and second portions 30a and 30 are parallel with each other. Moreover, the first and second passage portions 30a and 30b are not connected to each other; that is, they are separate from each other. In short, in this and other embodiments the passage portions 30a and 30b are the same, have a length, a width and a depth, and configured such that the length is one-and-a-half times the width and six-and-a-half times the depth.

Other embodiments are possible. For example, the passage 30 may be a single passage 30, or the passage 30 may include more than two portions 30a and 30b. For another example, the passage 30 may include a cross-sectional shape and/or a cross-sectional area that changes as the passage 30 extends from the first opening 44 to the second opening 48. For another example, the ratio of the passage's length to passage's width may be greater than or less than one-and-a-half, and the ratio of the passage's length to the passage's depth may be greater than or less than six-and-a-half.

Each of FIGS. 4A-4F shows a view of a housing of the light shown in FIG. 1, each according to another embodiment of the invention. FIGS. 4A-4E show one embodiment of the housing, and FIG. 4F shows another embodiment of the housing.

The housing 26 is similar to the lens 24. Thus, the discussion of the lens' pads 28, body 40 and passage 30 in conjunction with FIGS. 3A-3E applies to the housing 26 shown in FIGS. 4A-4F. More specifically, in this and other embodiments, the body 56 of the housing 26 is similar to the lens' body 40 except that the housing's body 56 does not have to transmit light generated by the light emitting device 22 (FIGS. 1 and 2), so the body 56 may or may not transmit such light. Similarly, in this and other embodiments, the pads 58 of the housing 26 are similar to the lens' pads 28 and position the housing's body 56 behind the light emitting device 22. Unlike the pad 28e of the lens, though, the corresponding pad 58 of the housing 26 does not extend from the first edge 60 of the body 56 to the second edge 62 of the body 56, and instead includes three pads 58a, 58b and 58c that do not divide the passage 34 into two separate portions. Similarly, in this and other embodiments, the passage 34 of the housing 26 is similar to the lens' passage 30 except that unlike the passage 30, the passage 34 does not include two separate portions. The passage 34, however, includes two first openings 64a and 64b that are each rectangular and have the same cross-sectional area, and two second openings 66a and 66b that are each rectangular and have the same cross-sectional area. Moreover, the total cross-sectional area of the first opening 64 is the same as the total cross-sectional area of the second opening 66.

Other embodiments are possible. For example, the middle pad 58 may be a single pad that extends from the housing's first edge 60 to the housing's second edge 62, much like the lens' pad 28e. Similarly, the lenses pad 28e may include three separate pads much like the housing's pads 58a, 58b and 58c.

As shown in FIG. 4F the housing 26 may include a pattern of holes 70 that facilitates the mounting of the housing 26, and thus the light emitting device 22 and lens 24, to any trailer. The pattern facilitates this by having two or more of the holes 70 located such that the most common arrangements of mounting holes in trailers may be used without drilling one or more holes in the housing 26. For example, some trailers may include two holes each of which aligns with a respective one of the two holes 70a and 70b, and other trailers may include three holes each of which aligns with a respective one of the three holes 70c, 70d and 70e. In addition, because the housing 26 includes the passage 34 that allows the outside environment to easily flow between the housing's body 56 and the light emitting device 22, the pattern of holes 70 may be easily revised in the field by adding a hole 70 or enlarging a hole 70 to accommodate a unique location for and/or size of a mounting hole in the trailer without adversely affecting the light emitting device. Thus, the housing 26 allows the light emitting device 22 and lens 24 to be universally mounted—i.e., mounted to any trailer and/or vehicle.

Each of FIGS. 5A-5E shows a view of a light emitting device 22 of the light shown 20 in FIG. 1, each according to an embodiment of the invention. FIG. 6 shows a schematic view of a circuit of the light emitting device shown in FIGS. 5A-5E, according to an embodiment of the invention.

In this and other embodiments, the light emitting device 22 includes an array of 88 light emitting diodes (LEDs) 78 (only seven labeled for clarity) mounted to a material-encapsulated circuit board 80. With the LEDs 78, the light emitting device 22 may easily withstand vibrational loads and/or mechanical shock loads experienced during use as a light 20 for a trailer. The LEDs 78 are arranged into eleven columns of eight LEDs 78, and the material encapsulation covers the circuit board, electronic components and a portion of each of the LEDs 78 where each LED 78 mounts to the circuit board, such that the circuitry is completely encapsulated and impervious to moisture damage. Each of the LEDs 78 includes an optic that protrudes from the plastic encapsulation and may focus or diffuse the light generated by its respective LED die. The encapsulating material may be any desired material capable of protecting the electronic components and circuit board from damage via exposure to the environment in which the light emitting device 22 is used in. For example, in this and other embodiments the encapsulating material is an epoxy compound. In other embodiments, the encapsulating material may be a silicone compound, polyurethane compound, rubber compound, and/or phenolic compound.

The light emitting device 22 also includes a terminal (here three) 82 to couple the plastic encapsulated circuit board to a source of electrical power. In this and other embodiments, the terminal 82 includes a receiver that has internal threads. To couple a source of electrical power to the light emitting device 22, a screw threadingly engages the internal threads of the terminal's receiver and holds against the receiver a terminal of the power source's wire.

Other embodiments are possible. For example, an incandescent lamp may generate the light that the device 22 emits. For another example, the light emitting device 22 may include more than or fewer than 88 LEDs 78.

Referring to FIG. 6, the circuit board 80 includes a circuit 86 that powers the LEDs 78 and that may include any desired components arranged in any desired configuration. For example, in this and other embodiments each column of LEDs 78 are arranged in parallel with the other ten columns of LEDs 78. Please note that for clarity FIG. 6 only shows four of the eight LEDs 78 (only 4 labeled) in four columns of the eleven columns that the light emitting device 22 includes. The circuit 86 also includes a diode 88 (here two for redundancy) that prevents the LEDs 78 from receiving power having a polarity opposite to the polarity of the power that the LEDs 78 in the circuit 86 are designed to function with. The circuit 86 also includes a diode 90 that diverts excess transient voltages away from the LEDs 78 in the circuit 86 to protect the LEDs 78. In this and other embodiments the polarity protection diodes 88 and the transient protection diodes 90 are redundant, but in other embodiments there may be a greater or lesser number of these components, or they may be eliminated altogether.

FIG. 7 shows a top view of a light 96, according to another embodiment of the invention. The light 96 is similar to the light 20 shown in FIGS. 1 and 2, except that the light 96 does not include a housing similar to the housing 26 of the light 20. More specifically, the lens 98 is similar to the lens 24 of the light 20, and the light emitting device 100 is similar to the light emitting device 22 of the light 20. This configuration of the light 96 may be used when the light emitting device 100 may be mounted directly to the trailer or other object that the light 96 will be used with. For example, the light emitting device 100 may be configured to be glued to a frame or panel of the trailer or other object.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A lens for a trailer light, the lens comprising:
a body that transmits light when exposed to light, the body having a first edge and a second edge located opposite the first edge; and
a pad operable to mount the lens in front of a light emitting device, wherein the pad includes five pads, each one of four of the pads being located at a respective one of four corners of the body, and the fifth pad being located in the middle of the body and extending from the first edge of the body to the second edge of the body, the pads being configured to position the body away from the light emitting device such that, when the lens is mounted in front of the light emitting device, a passage is formed between the light emitting device and the body, the passage having:
a first opening defined by the first edge of the body, and
a second opening defined by the second edge of the body;
wherein the first and second openings are configured such that:
water totally fills the passage when the lens is mounted to the light emitting device and the lens and light emitting device are submerged in water, and
the passage does not hold water when the lens and light emitting device emerge from being submerged in water.

2. The lens of claim 1 wherein the body has a thickness that is constant throughout the body.

3. The lens of claim 1 wherein the body transmits light without changing the direction of a portion of the light relative to the direction of another portion of the transmitted light.

4. The lens of claim 1 wherein the body has a thickness and the pad has a thickness that is more than twice the thickness of the body.

5. The lens of claim 1 wherein the pad is configured to position the body a distance away from the light emitting device that is constant when the distance is measured perpendicular to the light emitting device.

6. The lens of claim 1 wherein the first opening is rectangular.

7. The lens of claim 1 wherein the first opening and the second opening are rectangular.

8. The lens of claim 1 wherein the first opening has a total area and the second opening has a total area that is equal to the first area.

9. A housing for a trailer light, the housing comprising:
a body having a first edge and a second edge located opposite the first edge; and
a pad operable to mount the housing behind a light emitting device, wherein the pad includes five pads each one of four of the pads being located at a respective one of four corners of the body, and the fifth pad being located in the middle of the body and extending from the first edge of the body to the second edge of the body, the pads being configured to position the body away from the light emitting device such that, when the housing is mounted behind the light emitting device, a passage is formed between the light emitting device and the body, the passage having:
a first opening defined by the first edge of the body, and
a second opening defined by the second edge of the body;
wherein the first and second openings are configured such that:
water totally fills the passage when the housing is mounted to the light emitting device and the housing and light emitting device are submerged in water, and
the passage does not hold water when the housing and light emitting device emerge from being submerged in water.

10. The housing of claim 9 wherein the body includes a pattern of holes that allows the housing to be mounted on a trailer that includes a common arrangement of holes for mounting a trailer light to a trailer.

11. The housing of claim 9 the body has a thickness and the pad has a thickness that is more than twice the thickness of the body.

12. The housing of claim 9 wherein the pad is configured to position the body a distance away from the light emitting device that is constant when the distance is measured perpendicular to the light emitting device.

13. The housing of claim 9 wherein the first opening is rectangular.

14. The housing of claim 9 wherein the first opening and the second opening are rectangular.

15. The housing of claim 9 wherein the first opening has a total area and the second opening has a total area that is equal to the first area.

16. A trailer light comprising:
a light emitting device encapsulated with a material impervious to moisture and including an electronic component mounted to a circuit board;
a lens mounted in front of the light emitting device, the lens including:
a body that transmits light when exposed to light, the body having a first edge and a second edge located opposite the first edge; and
a pad configured to position the body away from the light emitting device such that a passage is formed between the encapsulated light emitting device and the body, the passage having:
a first opening defined by the first edge of the body, and
a second opening defined by the second edge of the body;
wherein the first and second openings are configured such that:
water totally fills the passage when the lens is mounted to the light emitting device and the lens and light emitting device are submerged in water, and
the passage does not hold water when the lens and light emitting device emerge from being submerged in water.

17. The trailer light of claim 16 wherein the light emitting device includes a light emitting diode.

18. The trailer light of claim 16 wherein the light emitting device includes an array of light emitting diodes.

19. The trailer light of claim 16 wherein the light emitting device includes an incandescent light bulb.

20. The trailer light of claim 16 wherein the passage has a cross-sectional area that remains constant from the first opening to the second opening.

21. The trailer light of claim 16 wherein the passage is rectangular.

22. The trailer light of claim 16 wherein the passage includes a length, a width and a depth, wherein the length is one-and-a-half times the width, and six-and-a-half times the depth.

23. The trailer light of claim 16 wherein the passage includes a first portion and a second portion that is not connected to the first portion.

24. The trailer light of claim 23 wherein the first and second portions are identical.

25. The trailer light of claim 23 wherein the second portion lies adjacent the first portion and is parallel to the first portion.

* * * * *